United States Patent [19]
Michel

[11] Patent Number: 5,381,951
[45] Date of Patent: Jan. 17, 1995

[54] THERMOSTATIC SAFETY VALVE FOR A HYDRAULIC COOLING CIRCUIT

[75] Inventor: Félix Michel, Paris, France

[73] Assignee: Nicolas Pinilla, Buenos Aires, Argentina; a part interest

[21] Appl. No.: 80,527

[22] Filed: Jun. 24, 1993

[51] Int. Cl.⁶ ............................................. F01P 7/16
[52] U.S. Cl. .............................. 236/34.5; 236/DIG. 2
[58] Field of Search ............... 236/34.5, DIG. 2, 100, 236/34

[56] References Cited

U.S. PATENT DOCUMENTS

| | | | |
|---|---|---|---|
| 3,498,537 | 3/1970 | Wong | 236/DIG. 2 |
| 3,558,046 | 1/1971 | Kelly | 236/DIG. 2 |
| 3,840,175 | 10/1974 | Jacuzzi | 236/20 |
| 4,245,782 | 1/1981 | Brown | 236/DIG. 2 |
| 4,469,275 | 9/1984 | DeSalve | 236/93 A |
| 4,828,167 | 5/1989 | Kuze | 236/100 X |
| 4,978,060 | 12/1990 | Stahly | 236/34.5 |
| 5,174,496 | 12/1992 | Bourgin | 236/DIG. 2 |
| 5,188,287 | 2/1993 | Chamot | 236/DIG. 2 |

FOREIGN PATENT DOCUMENTS 0295466 12/1988 European Pat. Off. .
3740500 4/1989 Germany .

Primary Examiner—William E. Tapolcai
Attorney, Agent, or Firm—Jacobson, Price, Holman & Stern

[57] ABSTRACT

A thermostatic safety valve includes a cage (1) inserted in an engine cooling circuit and defining an upstream chamber (16) having a flow opening (5) and a downstream chamber (17) having a flow opening (6) with communication between the chambers being controlled by a compound moving valve member (15, 21) cooperating with a fixed seat (23) and carried by a thermostatic capsule (9) which is subjected to the opposing actions of a thermally expandable material (14) that it contains and springs (18, 22). The valve member comprises two elements, firstly a peripheral element (21) situated in the upstream chamber (16) and urged by a first spring (22) against the seat (23), and secondly a central element (15) integral with the capsule (9) and pressing against the downstream face of the peripheral valve element (21) by the action of the capsule and thermally expandable material (14) and moving away therefrom under the force of a second spring (18).

3 Claims, 6 Drawing Sheets

5,381,951

THERMOSTATIC SAFETY VALVE FOR A HYDRAULIC COOLING CIRCUIT

BACKGROUND OF THE INVENTION

The invention relates to a thermostatic safety valve for a hydraulic cooling circuit, in particular for an internal combustion engine.

Such a valve is known and serves to interrupt the flow of cooling liquid to the radiator until the temperature of the engine has reached a determined value. The valve comprises a cage inserted in the cooling liquid circuit and defining an upstream chamber and a downstream chamber with communication between the chambers being controlled by a moving valve member suitable for co-operating with a fixed seat and carried by a thermostatic capsule subjected to opposing forces from a spring and from a thermally expandable material that it contains.

In a first embodiment that is presently in use, the thermally expandable material is a wax whose melting temperature corresponds to the action temperature selected for the valve. The thermostatic capsule seals one of the ends of a deformable sheath covering a rod fixed in the capsule downstream from the seat, and the wax fills a cavity of the capsule extending around the sheath. The valve member is carried by the capsule and the sheath is pressed against the cage.

So long as the valve member is pressed against its seat and interrupts any communication between upstream and downstream, the capsule is immersed in the upstream chamber and heats up on contact with the cooling liquid coming from the engine. The wax changes state and increases in volume on going from the solid state to the liquid state. Under such conditions, the capsule moves away from the rod in an upstream direction and increases the volume of the wax-containing cavity; as a result the valve member is lifted off its seat by moving in an upstream direction.

In the event of wax leaking out or of the cage breaking, the spring holds the valve member closed and temperature rises. Cooling is no longer performed and the engine becomes abnormally hot: it must be stopped to avoid worse damage such as rupture of the cylinder head gasket, seizing and damage to the engine itself, ...

In a second prior embodiment, the thermostatic capsule is a tubular bellows that is fluted to deform axially and that contains a liquid such as alcohol, ether, or some other liquid whose saturated vapor pressure corresponds to the intervention temperature selected for the valve. When the cooling liquid from the engine reaches said temperature while the valve is closed, then the capsule subjected to the saturated vapor pressure lengthens and opens the valve member in the downstream direction. If substance should leak out or the cage should break, then the valve member remains pressed against its seat and the same drawbacks as above appear.

In a third embodiment, the thermostatic capsule is similar to that of the first embodiment, and bears at its upstream end against the cage and the rod carrying the valve member. In the event of substance leaking out or of the cage breaking, the valve member likewise remains stuck against its seat.

BRIEF SUMMARY OF THE INVENTION

An object of the present invention is to reestablish the flow of cooling liquid when the valve member tends to remain stuck against its seat due to a loss of thermally expandable material or to the cage breaking.

To this end, and according to the invention, the valve is a double-acting valve member capable of lifting off the seat in one direction when the temperature of the cooling liquid reaches and exceeds the rated temperature, and in the opposite direction in the event of said material leaking out or in the event of a thrust element of the capsule breaking.

According to a particular feature, advantageously applicable to a wax thermostatic valve, the rod carrying the capsule containing the wax bears against a point inside the downstream chamber and the valve member is disposed, under proper operating conditions, in the upstream chamber, the valve member lifting off the seat and moving in an upstream direction under the effect of temperature rising, and in a downstream direction under the effect of wax leaking out or of the downstream portion of the cage breaking.

In a first embodiment, the valve member comprises two elements, firstly a peripheral element situated in the upstream chamber and urged by a first spring against the above-mentioned seat, and secondly a second element integral with the capsule and suitable for bearing against the downstream face of the peripheral valve element under drive from the wax and for moving away therefrom under drive from a second spring.

In a second embodiment, the valve member is integral with the capsule, is subjected to a spring, is capable of penetrating into the downstream chamber, and carries a gasket having a lip suitable for being pressed against the above-mentioned seat, for moving away therefrom in the upstream direction without deforming, and for moving away therefrom in the downstream direction by deforming against the wall of the downstream chamber.

BRIEF DESCRIPTION OF THE DRAWINGS

Other characteristics and advantages of the invention appear further from the following detailed description of embodiments of the invention shown by non-limiting example in the accompanying drawings, wherein:

FIGS. 7 to 9 are schematic cross-sectional views applicable to a saturated vapor pressure thermostatic valve showing the three above-mentioned operating states for a pair of valve members as shown in FIGS. 1 to 3 and 3a;

FIG. 10 is a view analogous to FIGS. 7 to 9, for a valve member that carries a sealing lip as in FIGS. 4 to 6 and 6a;

DETAILED DESCRIPTION

Figure 2:
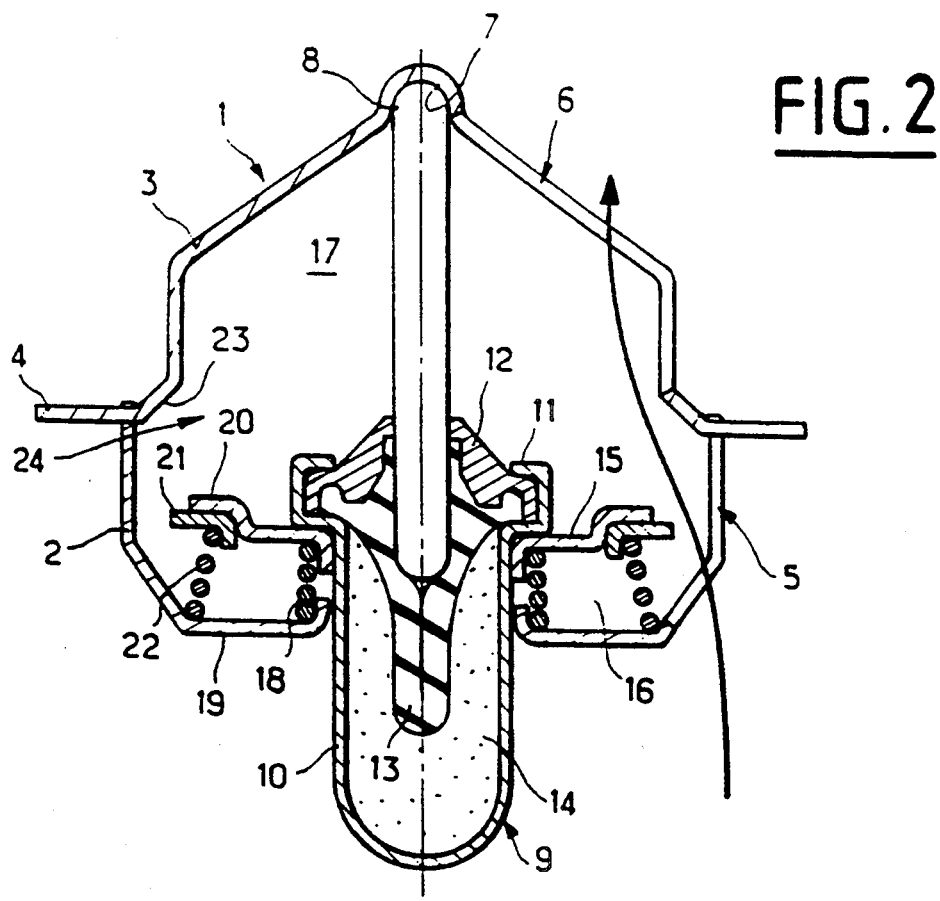
FIGS. 1 to 3 and 3a are cross-sectional views elevations in section showing a first embodiment of a wax thermostatic valve of the invention, respectively, in its closed position, in its open position due to an increase in temperature, and in its open position due to wax leaking out or to the downstream portion of the cage breaking, which positions define three operating states.

In well-known manner, the thermostatic valve shown in FIGS. 1 to 6 includes a cage 1 constituted by two metal shells 2 and 3 that are fixed to each other. The cage 1 is designed to be inserted in the cooling circuit of an internal combustion engine, e.g. by interposing a collar 4 between connection flanges in the circuit; the shells 2 and 3 have passages 5 and 6 in communication with the upstream and downstream portions, respectively, of the circuit.

The downstream shell 3 includes a housing 7 having a rod 8 centered therein and bearing thereagainst, with the free end of the rod having a thermostatic capsule 9 mounted thereon. The capsule includes a metal cylinder 10 extended by a rimmed collar 11 which is crimped onto a sleeve 12. The sleeve, which is threaded onto the rod 8, holds the open end of a deformable sheath 13 which caps said rod 8 against said rod and in said collar 11. A cavity 14 is then delimited by the capsule 9 around the sheath 13, and this cavity is filled with wax.

In the first embodiment as shown in FIGS. 1 to 3 and 3a, a central valve member 15 is integral with the cylinder 10 of the thermostatic capsule 9 and is capable of moving both in the downstream chamber 17 defined by the shell 3 and in the upstream chamber 16 defined by the shell 2. A helical spring 18 is disposed around the cylinder 10 and is interposed between the valve member 15 and the end wall 19 of the shell 2. The spring and the wax act in opposition on the cylinder 10.

The valve member 15 includes a stepped skirt 20 in which a peripheral annular valve member 21 can be centered which is itself subject to the action of a spring 22 bearing against the end wall 19 of the shell 2. The valve member 21 is suitable for co-operating with a tapering stationary seat 23 of the shell 3.

Figure 1:
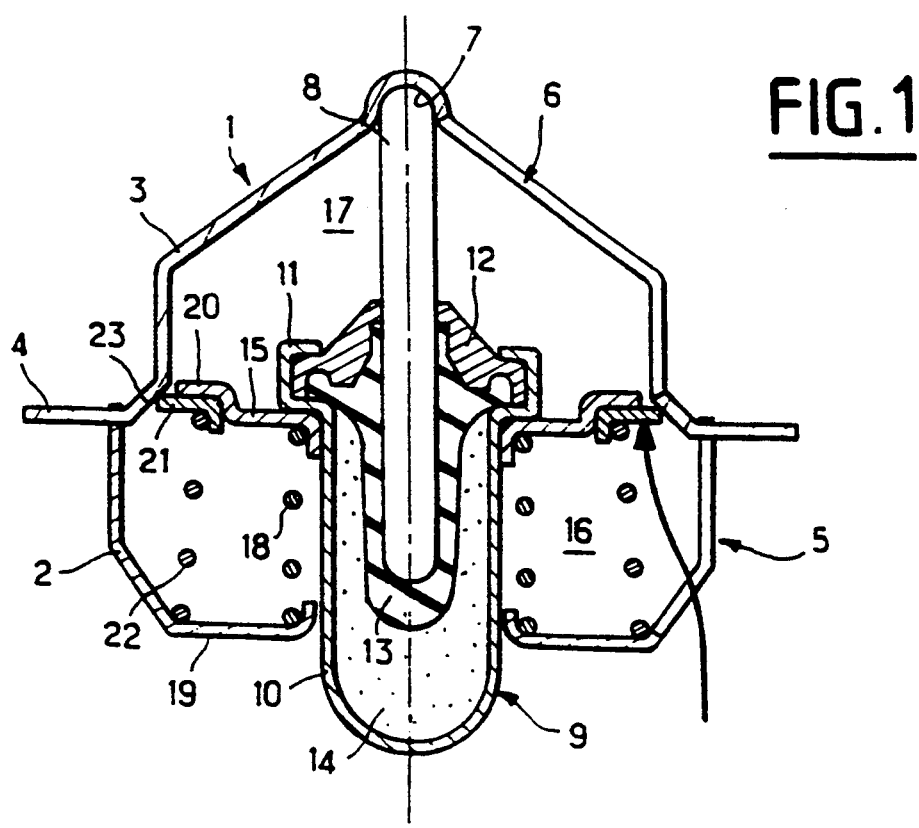

In the closed position shown in FIG. 1, the wax is in its solid, contracted state and the cylinder 10 of the capsule occupies a rest position. In this position, the valve member 15 rests via its skirt 20 on the valve member 21 which in turn is pressed by the spring 22 against the fixed seat 23. The valve members 15 and 21 thus separate the upstream chamber 16 from the downstream chamber 17, thereby interrupting the flow of cooling liquid.

When the temperature of the liquid reaches and exceeds the rated temperature of the thermostatic valve, i.e. the temperature above which cooling liquid flow is to be established, the wax in the cavity 14 melts and suddenly increases in volume. The wax is chosen because it melts at that temperature. As can be seen in FIG. 2, the effect of the wax increasing in volume is to move the cylinder 10 away from the free end of the rod 8, thereby causing the cylinder to slide along the rod. Under such conditions, the two valve members 15 and 21 that remain pressed against each other are moved away from the seat 23, thereby opening a passage 24.

Under such conditions, communication is established between the upstream chamber 16 and the downstream chamber 17, so that cooling liquid from the upstream of the circuit passes through opening 5 in the shell 2, through the chamber 16, through the passage 24, through the chamber 17, and through openings 6 in the shell 3 thus enabling it to flow towards the radiator.

When the temperature of the cooling liquid drops, the wax shrinks in volume by solidifying so the valve members 15 and 21 close against the seat 23 under drive from the springs 18 and 22.

Figure 3:
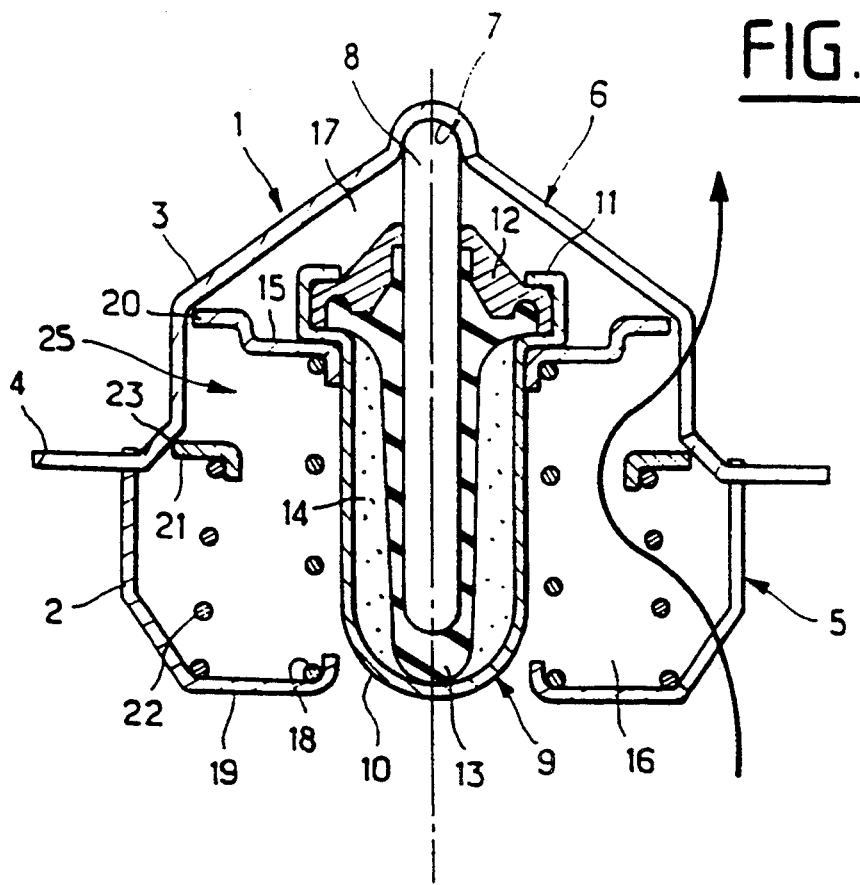
Figure 3A:
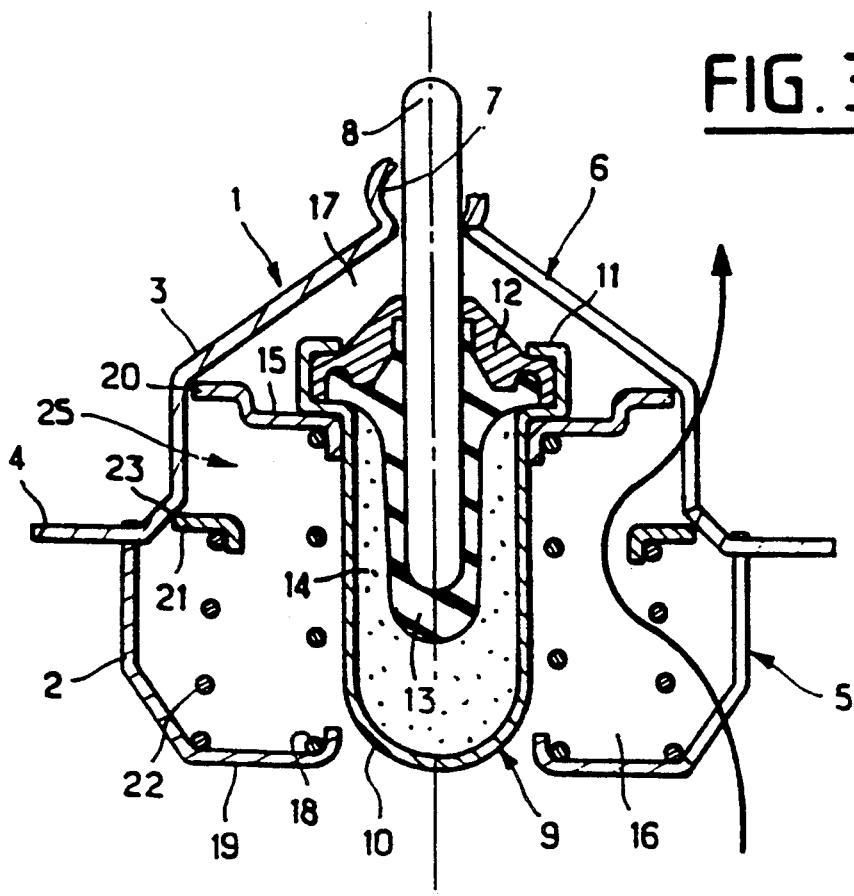

FIG. 3 shows the open position in the event of wax leaking out, and FIG. 3a shows the same position in the event of the downstream portion of the cage breaking. In both cases, the spring 18 causes the cylinder 10 to slide downstream until the end of the cylinder comes into abutment via the sheath 13 against the tip of the rod 8. The valve member 21 continues to be pressed against the seat 23 by the spring 22, but the valve member 15 which is of smaller diameter moves away therefrom inside the downstream chamber 17, thereby opening a passage 25.

As a result, communication is established via the passage 25 between the upstream chamber 16 and the downstream chamber 17. Consequently, the valve does not remain closed and the temperature of the cooling liquid does not rise abnormally. This is equivalent to eliminating the thermostatic valve, with the drawback of an increase in the time required for the engine to reach its operating temperature, and also of an increase in the time required for the heater to become effective, but with the advantage of avoiding the engine breaking down and/or being damaged.

Figure 4:
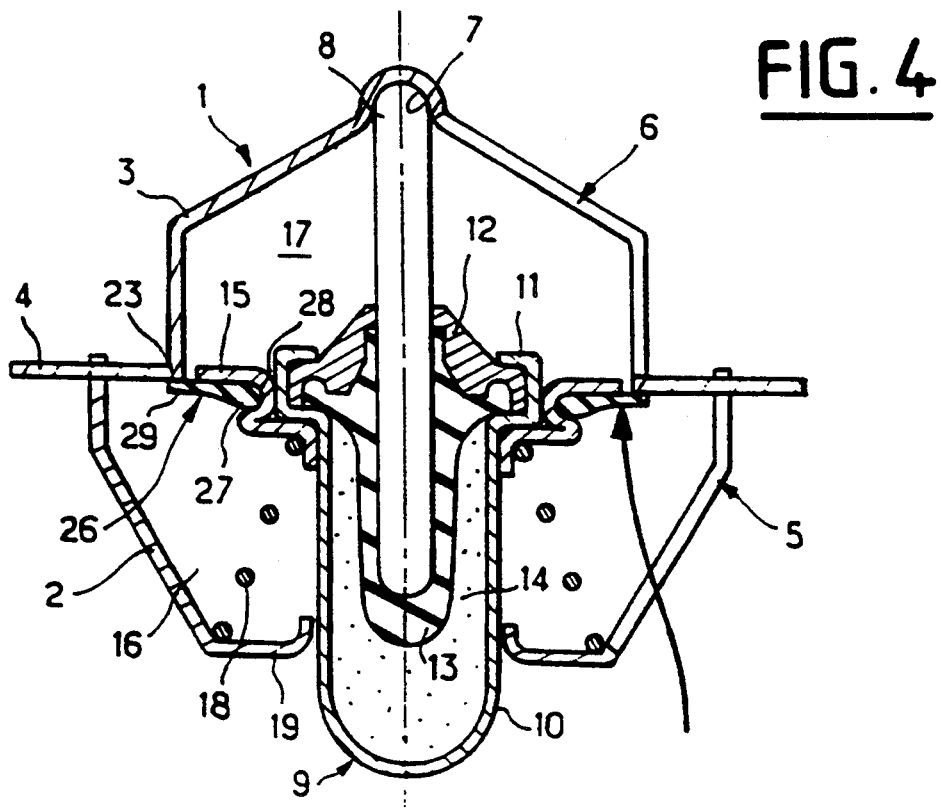

The second embodiment shown in FIGS. 4 to 6 and 6a differs from the first embodiment in that the valve member 21 is omitted and is replaced by a lip seal 26 mounted on the valve member 15 which is fixed to the cylinder 10 of the capsule and which is subjected to thrust from the spring 18. To this end, the gasket includes a central annular bead 27 received in a groove 28 of the valve member 15 and surrounded by a flexible outwardly projecting lip 29 which, in the rest position shown in FIG. 4, is pressed against the seat 23 to isolate the two chambers 16 and 17 from each other. Advantageously, the seat 23 is flat and the spring 18 is a conical helical spring.

Figure 5:
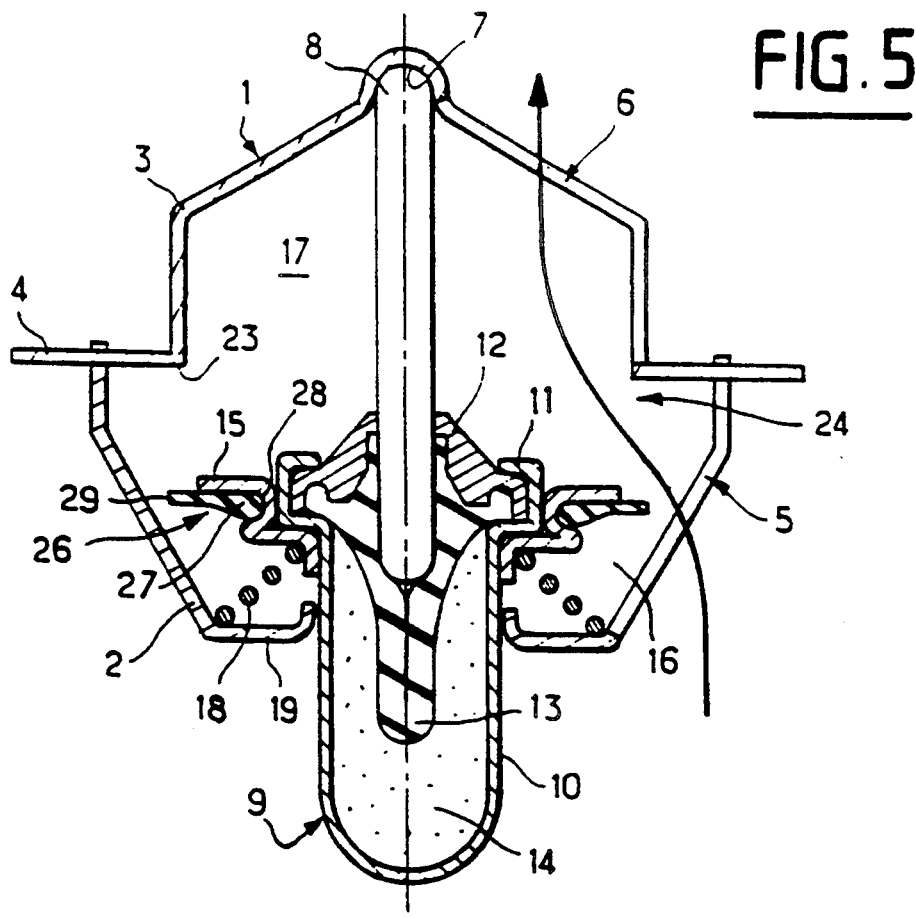
FIGS. 4 to 6 and 6a are views analogous to FIGS. 1 to 3 and 3a, respectively, showing a second embodiment of a wax thermostatic valve of the invention.
Figure 6:
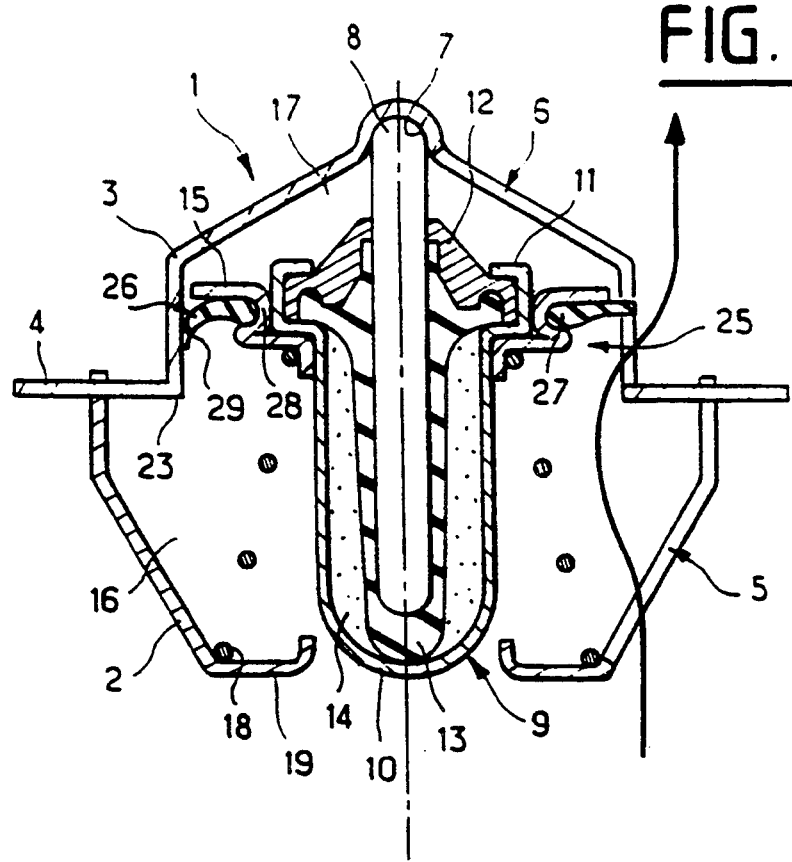
Figure 6A:
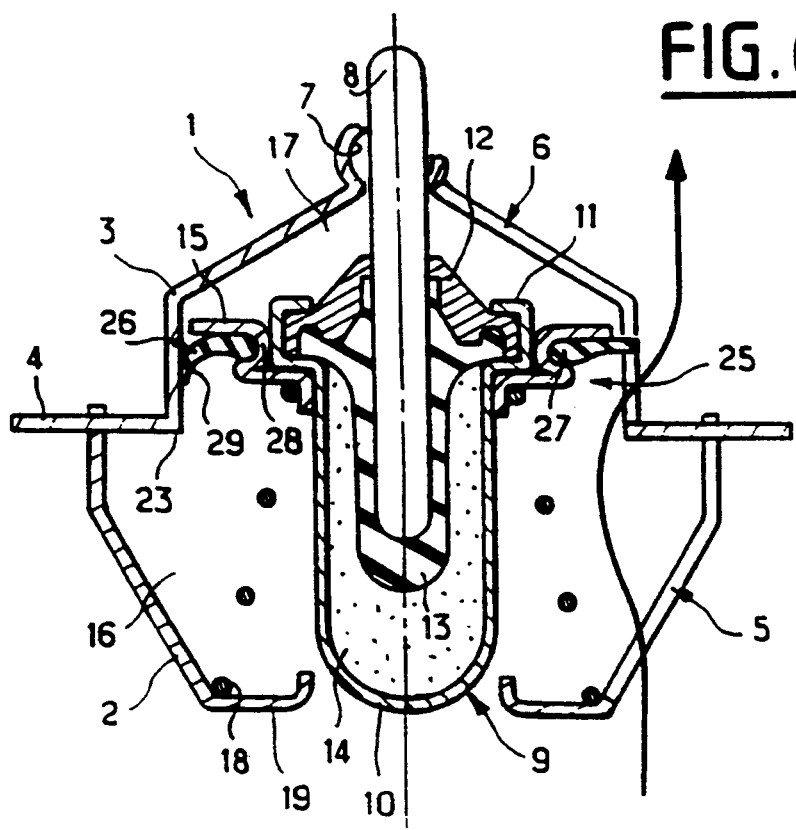

In the open position due to a rise in temperature as shown in FIG. 5, the lip 29 remains plane and extends into the upstream chamber 16. However, in the open position due to wax leaking out as shown in FIG. 6, or due to the downstream portion of the cage breaking as shown in FIG. 6a, the lip 29 is deformed into a bell shape against the wall of the shell 3, thereby uncovering the access passage 25 of the downstream chamber 17.

The double-acting valve member 15, 21 (FIGS. 1 to 3 and 3a) or 15, 29 (FIGS. 4 to 6 and 6a) is applied in the above description to a wax thermostatic valve. It could also be applied to a saturated vapor pressure valve as shown diagrammatically in FIGS. 7 to 9.

Such a valve comprises a fluted tubular bellows 30 made of metal and axially deformable. It is closed in sealed manner and contains a volatile liquid. The bellows 30 is received in the upstream chamber 16 of a cage. It carries a first valve member 15 urged against a spring 18 towards a second valve member 21, itself urged by a spring 22 against a seat 23. The springs are received in the upstream chamber 17 of the cage 1 and the valve members extend therein so long as the valve is in its rest position (FIG. 7).

Figure 10:
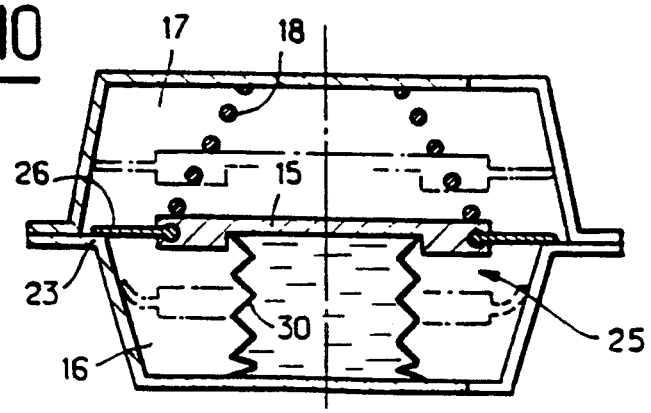

In another embodiment similar to that of FIGS. 4 to 6 and 6a, the valve member 15 integral with the capsule 9 carries a lip gasket 26 and is urged by a spring 18 so that when in the above-mentioned rest position (FIG. 10), the lip of the gasket 26 is pressed against the seat 23. The spring is likewise received in the downstream chamber 17 of the cage and the valve member together with its gasket normally extends therein.

The double-acting valve members 15, 21 and 15, 26 operate in the same way as before, but inversely. In the high temperature open position (FIGS. 8 and 10), the valve member penetrates into the downstream chamber 17 to open the passage 24, and in the open position due to leakage of the volatile liquid (FIGS. 9 and 10) or due to the upstream portion of the cage breaking, said valve member penetrates into the upstream chamber 16 to open the passage 25.

Figure 7:
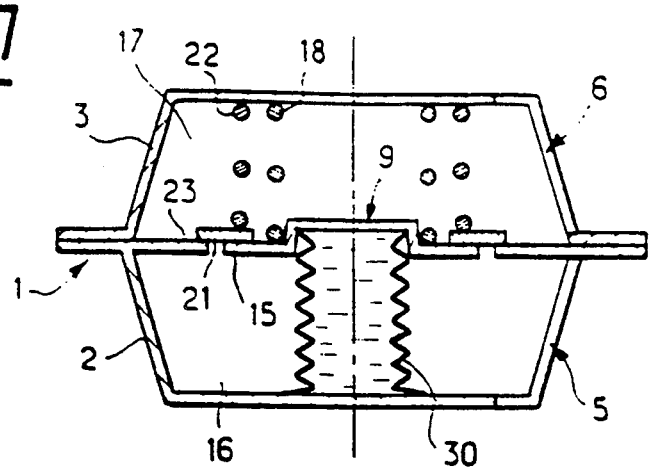
Figure 8:
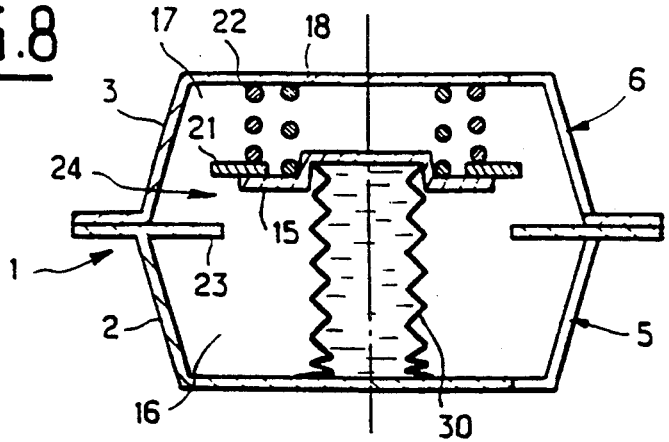
Figure 9:
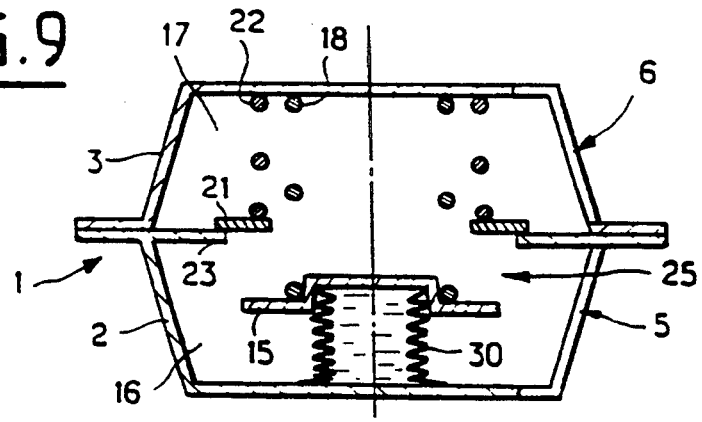
Figure 11:
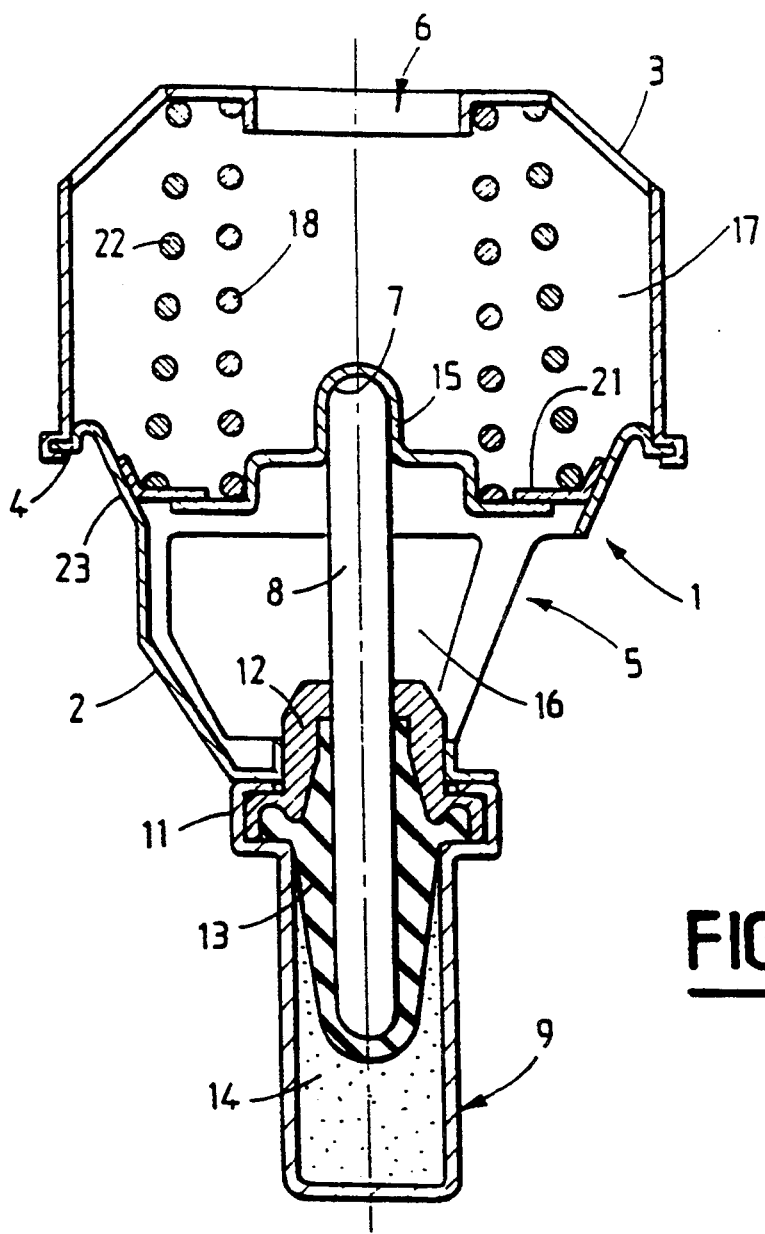
FIG. 11 is a cross-sectional view showing a variant of a wax thermostatic valve of the invention in its closed position.

FIG. 11 shows a variant embodiment of the thermostatic valve of FIGS. 7 to 9, in which the bellows 30 is replaced by a thermostatic wax capsule 9 situated upstream from the seat 23, with the cylinder 10 thereof being secured to the upstream shell 2 and the rod 8 bearing into a housing 7 provided in the first valve member 15.

When the temperature of the cooling liquid reaches and exceeds the rated temperature of the thermostatic valve, the rod 8 pushes the first valve member 15 and the second valve member 21 against the spring 18 and the spring 22 in the downstream chamber 17. In the event of wax leaking out or of the upstream cell 2 breaking, the spring 18 pushes the first valve member 15 into the upstream chamber 16. The two valve members 15 and 21 may also be replaced by a single valve member 15 having a gasket 26 with a lip 29 suitable for being pressed against the seat 23, similarly to the embodiment of FIGS. 4–6.

Figure 12:
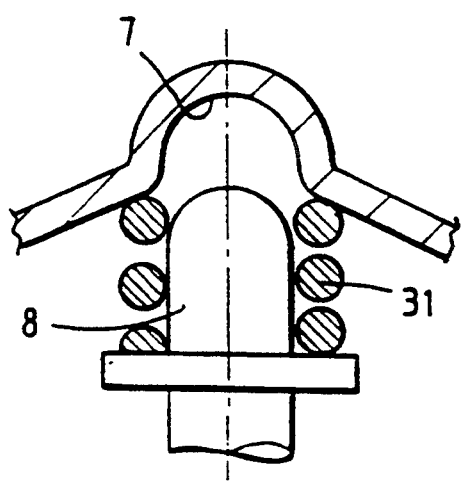
FIG. 12 is an enlarged view detail of the connection between the rod of a wax thermostatic capsule and the housing for the rod.

In order to provide sealing of the wax thermostatic valve in the closed position shown in FIGS. 1 and 11, it is advantageous to interpose a third spring 31 (see FIG. 12) between the end of the rod 8 and the housing 7 provided in the downstream shell 3 (FIG. 3) or in the first valve member 15 (FIG. 11). Under such circumstances, in the closed position, the rod 8 does not bear directly against the housing 7. The force of the third spring 31 is designed so that taking account of the difference in liquid pressure between the upstream chamber 16 and the downstream chamber 17, it is capable of compensating the force of the second spring 18 while still being less than the sum of the forces exerted by the springs 18 and 22.

As can be seen in FIG. 11, a sealing gasket 32 may be disposed between the facing walls of the first valve member 15 and of the second valve member 21. By compressing this gasket 32 to a small extent when the thermostatic valve is in its closed position, it is possible to compensate for constructional defects in the valve members 15 and 21. The compression force that acts on the gasket 32 can be adjusted by deforming the wall of the housing 7 or by means for adjusting the position of the free end of the rod 8 in the housing 7.

I claim:

1. A thermostatic safety valve for a cooling circuit of an internal combustion engine comprising:
    a cage insertable in said cooling circuit;
    an upstream chamber in said cage;
    a downstream chamber in said cage;
    a coolant flow opening in said cage communicating with said downstream chamber;
    a coolant flow opening in said cage communicating with said upstream chamber;
    a fixed valve seat on said cage at a position between said upstream and downstream chambers;
    a thermostatic capsule movably mounted in said cage for movement between an open position for said valve and a closed position for said valve;
    thrust means between said thermostatic capsule and said cage;
    a multi-part valve member having a first part mounted on said thermostatic capsule for movement therewith and a second part engageable with said fixed valve seat in said closed position for preventing coolant flow between said chambers and disengageable from said fixed valve seat in said open position to facilitate coolant flow between said chambers;
    spring means between said cage and said valve member for resiliently urging said valve member toward said closed position into engagement with said fixed valve seat; and
    thermally expandable material within said thermostatic capsule in cooperating relationship with said thrust member for moving said capsule and said valve member from said closed position at a coolant temperature below a predetermined temperature to said open position at a coolant temperature above said predetermined temperature against the force of said spring means;
    said valve member comprising a double-acting valve member disengageable from said fixed valve seat by movement in one direction toward said open position due to expansion of said thermally expandable material at said predetermined temperature and by movement of said first part in the opposite direction due to said spring means in the event of leaking of said thermally expandable material from said capsule and/or breaking of said thrust means.

2. The thermostatic valve as claimed in claim 1 wherein:
    said thrust means comprises a fixed rod having one end engaging said cage at a position thereon within said downstream chamber and the other end extending into said thermostatic capsule; further comprising
    a deformable sheath mounted in said capsule and having one end through which said fixed rod extends in relatively movable and sealing engagement therewith; and
    said thermostatic capsule comprises a cylinder member and a cavity between said deformable sheath and said cylinder member for containing said thermally expandable material so that when said coolant temperature reaches said predetermined temperature said thermally expandable material moves said capsule relative to said fixed rod and said deformable sheath to said open position of said valve;
    said double-acting valve member being disposed in normal operating conditions in said upstream chamber and lifting off said valve seat and moving in an upstream direction in said upstream chamber when said coolant temperature reaches said predetermined temperature, and moving in a downstream direction with at least said first part in said downstream chamber upon said leaking of said thermally expandable material from said capsule, and/or breaking of said cage in a portion thereof in said downstream chamber to maintain coolant flow through said valve to prevent overheating of the engine.

3. A thermostatic safety valve for a cooling circuit of an internal combustion engine comprising:

a cage insertable in said cooling circuit;

an upstream chamber in said cage;

a downstream chamber in said cage;

a coolant flow opening in said cage communicating with said downstream chamber;

a coolant flow opening in said cage communicating with said upstream chamber;

a fixed valve seat on said cage at a position between said upstream and downstream chambers;

a thermostatic capsule movably mounted in said cage for movement between an open position for said valve and a closed position for said valve;

thrust means between said thermostatic capsule and said cage, said thrust means comprising a fixed rod having one end engaging said cage at a position thereon within said downstream chamber and the other end extending into said thermostatic capsule, and a deformable sheath mounted in said capsule and having one end through which said fixed rod extends in relatively movable and sealing engagement therewith;

a cavity between said deformable sheath and said thermostatic capsule for containing said thermally expandable material so that when said coolant temperature reaches said predetermined temperature said thermally expandable material moves said capsule relative to said fixed rod and said deformable sheath to said open position of said valve;

a valve member mounted on said thermostatic capsule for movement therewith and engageable with said fixed valve seat in said closed position for preventing coolant flow between said chambers and disengageable from said fixed valve seat in said open position to facilitate coolant flow between said chambers;

spring means between said cage and said valve member for resiliently urging said valve member toward said closed position into engagement with said fixed valve seat; and thermally expandable material within said thermostatic capsule in cooperating relationship with said thrust member for moving said capsule and said valve member from said closed position at a coolant temperature below a predetermined temperature to said open position at a coolant temperature above said predetermined temperature against the force of said spring means;

said valve member comprising a double-acting valve member disengageable from said fixed valve seat by movement in one direction toward said open position due to expansion of said thermally expandable material at said predetermined temperature and by movement in the opposite direction due to said spring means in the event of leaking of said thermally expandable material from said capsule and/or breaking of said thrust means;

said double-acting valve member being disposed in normal operating conditions in said upstream chamber and lifting off said valve seat and moving in an upstream direction in said upstream chamber when said coolant temperature reaches said predetermined temperature, and moving in a downstream direction in said downstream chamber upon said leaking of said thermally expandable material from said capsule, and/or breaking of said cage in a portion thereof in said downstream chamber to maintain coolant flow through said valve to prevent overheating of the engine;

said double-acting valve member comprising;

a first peripheral valve element disposed in said upstream chamber, a downstream face on said first peripheral valve element, and;

a second valve element integral with said capsule and engageable in normal operating conditions against said downstream face of said first peripheral valve element under normal operating conditions by said thermostatic capsule; and said spring means comprising a first spring between said cage and said first peripheral valve element urging said first peripheral valve element into engagement with said fixed valve seat, and a second spring between said cage and said second valve element for urging said second valve element away from said engagement with said downstream face of said first peripheral valve element.

* * * * *